(12) United States Patent
Handa

(10) Patent No.: US 10,118,416 B2
(45) Date of Patent: Nov. 6, 2018

(54) PRINTER, METHOD OF PRINTING CONTROL, AND COMPUTER-READABLE STORAGE MEDIUM

(71) Applicant: CASIO COMPUTER CO., LTD., Tokyo (JP)

(72) Inventor: Yuji Handa, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/591,372

(22) Filed: May 10, 2017

(65) Prior Publication Data
US 2018/0001675 A1 Jan. 4, 2018

(30) Foreign Application Priority Data
Jun. 30, 2016 (JP) .................................. 2016-131143

(51) Int. Cl.
*B41J 11/66* (2006.01)
*G06K 15/00* (2006.01)
(Continued)

(52) U.S. Cl.
CPC ......... *B41J 11/663* (2013.01); *G06K 15/1809* (2013.01); *G06K 15/404* (2013.01); *B41J 3/4075* (2013.01)

(58) Field of Classification Search
CPC ......... B41J 11/66; B41J 11/663; B41J 11/666; B41J 11/70; B41J 11/703; B41J 3/4075;
(Continued)

(56) References Cited

U.S. PATENT DOCUMENTS

2007/0258748 A1* 11/2007 Moriyama ............... B41J 11/70
400/621
2009/0118868 A1* 5/2009 Sato ....................... B41J 11/663
700/275
(Continued)

FOREIGN PATENT DOCUMENTS

JP 2007-176052 A 7/2007
JP 2017114084 A * 6/2017 ............ B41J 11/663

OTHER PUBLICATIONS

Kataoka, MachineTranslationofJP 2017114084 A, Dec. 15, 2015.*

*Primary Examiner* — Geoffrey S Mruk
*Assistant Examiner* — Scott A Richmond
(74) *Attorney, Agent, or Firm* — Chen Yoshimura LLP

(57) ABSTRACT

A printer includes an acquisition device that acquires printing data and identification information that identifies at least one of a user who sent the printing data and a device that generated the printing data, a first cutting device that cuts a printing medium that has been printed on, and a processor. When the acquisition device acquires first printing data and first identification information of the first printing data and then acquires second printing data and second identification information of the second printing data, the processor determines, in accordance with the first identification information and the second identification information, whether to use the first cutting device to separate one or more first printed materials created on the printing medium in accordance with the first printing data from one or more second printed materials created on the printing medium in accordance with the second printing data.

8 Claims, 15 Drawing Sheets

(51) Int. Cl.
*G06K 15/02* (2006.01)
*B41J 3/407* (2006.01)

(58) Field of Classification Search
CPC ....... B41J 2202/30; B41J 2/32; G06K 15/022;
G06K 15/028; G06K 15/404
See application file for complete search history.

(56) References Cited

U.S. PATENT DOCUMENTS

2013/0078024 A1\* 3/2013 Handa ........................ B41J 2/32
400/621
2017/0182803 A1\* 6/2017 Kataoka ................. B41J 15/005

\* cited by examiner

Printing one at a time (blank portion m at front each time)

Printing continuously (fill in the middle blank portions m to eliminate waste)

User A: prints four address labels

User B: prints two inventory management labels

User A: prints an additional three address labels

PRINTER, METHOD OF PRINTING CONTROL, AND COMPUTER-READABLE STORAGE MEDIUM

BACKGROUND OF THE INVENTION

1. Field of the Invention

The present invention relates to a printer, a method of printing control, and a computer-readable storage medium for creating printed materials.

2. Description of the Related Art

Label printers are a conventionally well-known technology for creating labels by printing arbitrary text, graphics, patterns, and the like on an elongated printing medium and then cutting the printed portion from the printing medium. One well-known type of such a label printer includes a half-cutting device for making half cuts (that is, by cutting only the base material of a printing medium that includes a base material and a release paper) and a full-cutting device for making full cuts (that is, by cutting both the base material and the release paper) in order to separate the label from the printing medium (see Patent Document 1, for example).

RELATED ART DOCUMENT

Patent Document

Patent Document 1: Japanese Patent Application Laid-Open Publication No. 2007-176052

Next, three methods of printing according to first to third conventional technologies for creating labels (an example of a printed material) will be described.

FIGS. 14A to 14H are explanatory drawings for explaining a method of printing according to the first conventional technology.

The printing medium M illustrated in FIG. 14A is conveyed rightwards in the figure so as to travel to a printhead position, a full-cutting device position, a half-cutting device position, and a feedout port position in that order. In FIG. 14A, the end of the printing medium M is currently at the full-cutting device position. This because the previously created label was separated from the printing medium M at that full-cutting device position. Meanwhile, as illustrated in FIG. 14B, Japanese text corresponding to "New Product" begins to be printed on the printing medium M at the printhead position. Therefore, a blank portion m is present on the end of the printing medium M due to the distance between the position of the heating elements of the printhead (for a thermal head) and the position of the blade of the full-cutting device.

As illustrated in FIG. 14H, this blank portion m remains connected to a label L10 when the label L10 is cut from the printing medium M. This is because after printing begins as illustrated in FIG. 14B, the printing medium M is conveyed until the rear end of the blank portion m reaches the half-cutting device position, as illustrated in FIG. 14C, and then printing is temporarily suspended in order to half-cut the rear end of the blank portion m, as illustrated in FIG. 14D. In label printers that do not include a half-cutting device, keeping a blank portion on the rear end side of the label that is equal in length to the blank portion m makes it possible to maintain left-right symmetry about the printed portion of the label.

Next, as illustrated in FIG. 14E, the suspended printing process is resumed. As illustrated in FIG. 14F, once printing is complete, the printing medium M is conveyed until the rear end of the created label L10 reaches the full-cutting device position. Then, as illustrated in FIG. 14G, the rear end of the label L10 is cut from the printing medium M by the full-cutting device. In this way, the label L10 is created as illustrated in FIG. 14H, with the blank portion m described above remaining connected to the label L10 on the other side of the half cut.

The half-cut portion resulting from the half cut made between the blank portion m and the label L10 makes it easier to peel the label L10 from the release paper (release sheet). However, the blank portion m is not used as part of the actual label, and therefore the longer this blank portion m is, the less the usage ratio of the label L10 per unit length of the printing medium M becomes.

FIGS. 15A and 15B are explanatory drawings for explaining a method of printing according to the second conventional technology.

As illustrated in FIG. 15A, when three labels L21, L22, and L23 each printed with the text "ABC" are created one at a time using the method described above, each of those three labels L21, L22, and L23 includes the blank portion m remaining connected on the other side of a half cut.

However, as illustrated in FIG. 15B, if the three labels L21, L22, and L23 are instead created continuously and separated by half cuts, there is only a single blank portion m that remains connected to the first label L21. In this way, when multiple labels L21, L22, and L23 are created at the same time using such a continuous or sequential printing process or the like, creating the labels L21, L22, and L23 continuously but separated by half cuts makes it possible to leave only a single blank portion m remaining connected to those labels L21, L22, and L23.

FIGS. 16A to 16C and FIG. 17 are explanatory drawings for explaining a method of printing according to the third conventional technology.

Instead of including an input unit and a display unit for creating printing content such as text, graphics, and patterns to be printed on labels, some label printers are connected via a wireless or wired connection to a computing device such as a personal computer, smartphone, or tablet and receive printing data that includes the printing content from that computing device. Moreover, some of these types of label printers are designed to be shared by multiple users and can therefore receive printing data from multiple users' computing devices.

In this case, the labels L31-1 to L31-7 illustrated in FIGS. 16A and 16C that user A is attempting to create and the labels L32-1 and L32-2 illustrated in FIG. 16B that user B is attempting to create, for example, can both be created on a single label printer.

As described above, if user A creates the four address labels L31-1 to L31-4 at once as illustrated in FIG. 16A, or if user B creates the two inventory management labels L32-1 and L32-2 at once as illustrated in FIG. 16B, or if user A creates the additional three address labels L31-5 to L31-7 at once as illustrated in FIG. 16C, in each case there is only one blank portion m per group of several labels.

Moreover, even if multiple sets of printing data (such as the three sets of data illustrated in FIGS. 16A to 16C) are received separately, configuring the printing data to specify a continuous printing mode makes it possible to create all of the labels continuously with half cuts made between the groups of labels corresponding to the subsequently received sets of printing data. This also makes it possible to leave just a single blank portion m for all of the labels corresponding to the separately received sets of printing data.

However, as illustrated in FIG. 17, when creating labels from separately received sets of printing data, if all of the labels to be created are created continuously and separated by half cuts, user A's labels L31-1 to L31-7 and user B's labels L32-1 and L32-2 get intermixed with one another. When the labels that multiple users are attempting to create are connected together in this intermixed manner, user A's labels L31-1 to L31-7 need to be separated from user B's labels L32-1 and L32-2 using scissors or the like, or user A may end up unintentionally taking user B's labels L32-1 and L32-2, for example.

SUMMARY OF THE INVENTION

The present invention makes it possible to provide a printer, a method of printing control, and a computer-readable storage medium that can prevent users' printed materials from getting intermixed with one another when multiple users each use a single printer to create a plurality of printed materials on a printing medium without cutting that printing medium.

Accordingly, the present invention is directed to a scheme that substantially obviates one or more of the problems due to limitations and disadvantages of the related art.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a printer, including: an acquisition device that acquires printing data for creating one or more printed materials and identification information that identifies at least one of a user who sent the printing data and a device that generated the printing data; a printing device that prints the printing data corresponding to the one or more printed materials on a printing medium; a first cutting device that separates the printing medium that has been printed on; and a processor that, when the acquisition device acquires first printing data and first identification information as the identification information of the first printing data and then acquires second printing data and second identification information as the identification information of the second printing data, determines, in accordance with the first identification information and the second identification information, whether to use the first cutting device to separate one or more first printed materials created in accordance with the first printing data on the printing medium from one or more second printed materials created on the printing medium in accordance with the second printing data, and controls the first cutting device in accordance with the determination.

In another aspect, the present disclosure provides a method of printing control to be performed by a printer that includes a printing device that prints printing data corresponding to one or more printed materials on a printing medium; and a first cutting device that separates the printing medium that has been printed on, the method including: acquiring first printing data for creating one or more first printed materials on the printing medium and first identification information that identifies at least one of a user who sent the first printing data and a device that generated the first printing data; acquiring second printing data for creating one or more second printed materials on the printing medium and second identification information that identifies at least one of a user who sent the second printing data and a device that generated the second printing data; determining, in accordance with the first identification information and the second identification information, whether to use the first cutting device to separate the one or more first printed materials created on the printing medium in accordance with the first printing data from the one or more second printed materials created on the printing medium in accordance with the second printing data; and controlling the first cutting device in accordance with the determination.

In another aspect, the present disclosure provides a non-transitory computer-readable storage medium having stored therein a printing control program executable by a printer, wherein the printer includes an acquisition device that acquires printing data for creating one or more printed materials and identification information that identifies at least one of a user who sent the printing data and a device that generated the printing data; a printing device that prints the printing data corresponding to the one or more printed materials on a printing medium; and a first cutting device that separates the printing medium that has been printed on based on the printing data, and wherein, when the acquisition device acquires first printing data and first identification information as the identification information of the first printing data and then acquires second printing data and second identification information as the identification information of the second printing data, the printing control program causes the printer to determine, in accordance with the first identification information and the second identification information, whether to use the first cutting device to separate one or more first printed materials created on the printing medium in accordance with the first printing data from one or more second printed materials to be created in accordance with the second printing data, and controls the first cutting device in accordance with the determination.

It is to be understood that both the foregoing general description and the following detailed description are exemplary and explanatory, and are intended to provide further explanation of the invention as claimed.

BRIEF DESCRIPTION OF THE DRAWINGS

FIGS. 14A to 14H are explanatory drawings for explaining a method of printing according to a first conventional technology.

DETAILED DESCRIPTION OF EMBODIMENTS

Next, a printer, a method of printing control, and a program according to an embodiment of the present invention will be described with reference to figures.

Figure 1:
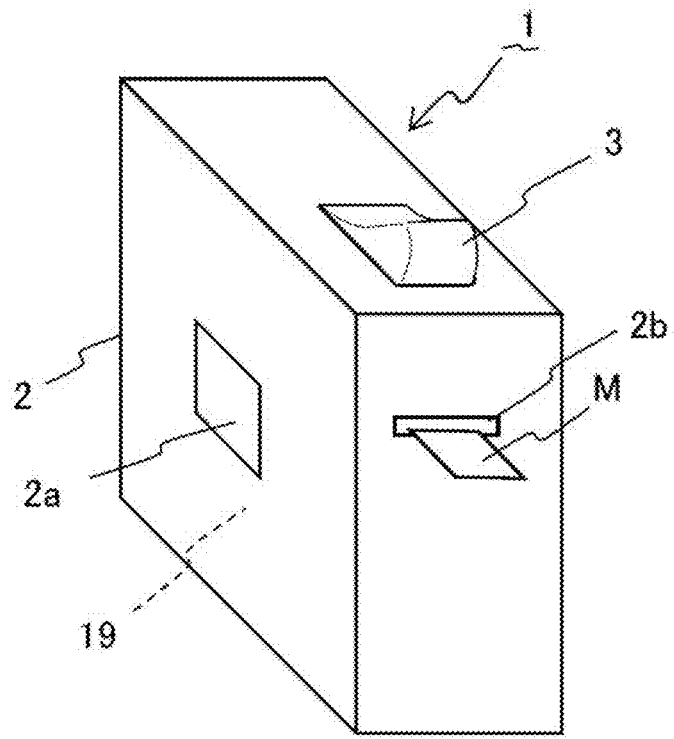
FIG. 1 is a perspective view illustrating a printer according to an embodiment of the present invention.

FIG. 1 is a perspective view illustrating a printer 1 according to the present embodiment.

The printer 1 illustrated in FIG. 1 is a label printer that prints using a single-pass scheme, for example, and includes a thermal head 10 (which is an example of a printing device that prints on an elongated printing medium M based on printing data).

The printing medium M is a tape that includes a base material Ma having an adhesive layer as well as a release paper Mb that is peelably adhered to the base material Ma so as to cover the adhesive layer, for example.

Below, a thermal transfer label printer that uses an ink ribbon is described as an example, but the printing scheme is not particularly limited, and a thermal printing scheme that utilizes thermal paper may alternatively be used, for example.

Moreover, the components included in the printer 1 may be modified as appropriate as long as a controller 5 (processor), the thermal head 10 (an example of a printing device), a full-cutting device 16 (an example of a first cutting device), and an interface device 25 (an example of an acquisition device) are still included.

As illustrated in FIG. 1, the printer 1 includes a case 2 and a cassette compartment 19.

Figure 5:
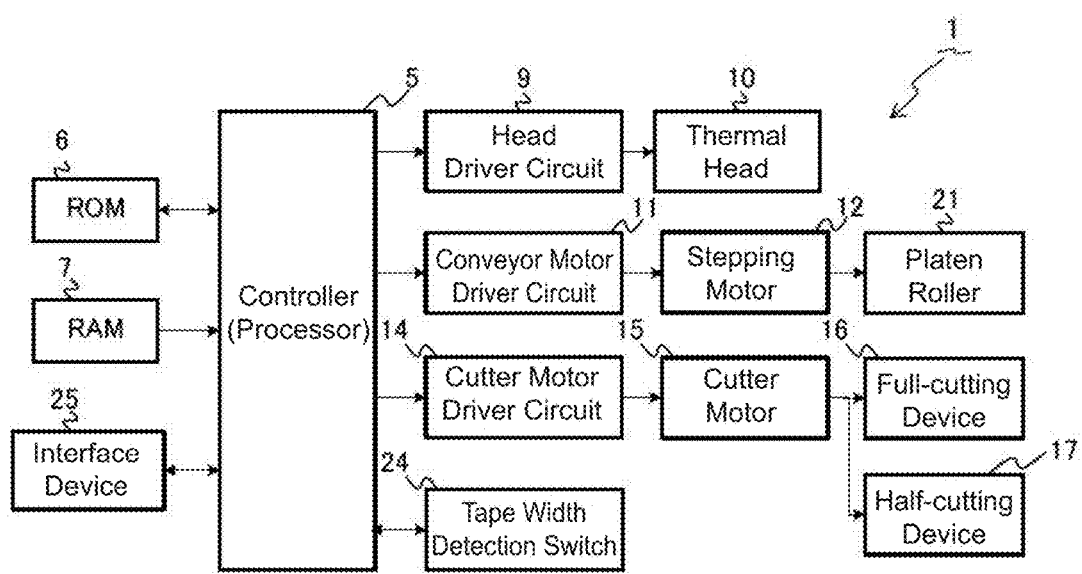
FIG. 5 is a control block diagram illustrating the printer according to the embodiment.

Note that although here the printer 1 can receive printing data from a user's computing device (an example of a device that generates printing data) via the interface device 25 illustrated in FIG. 5 and therefore does not include an input device or a display device for creating printing data, the printer 1 may also include such an input device and display device.

Figure 3:
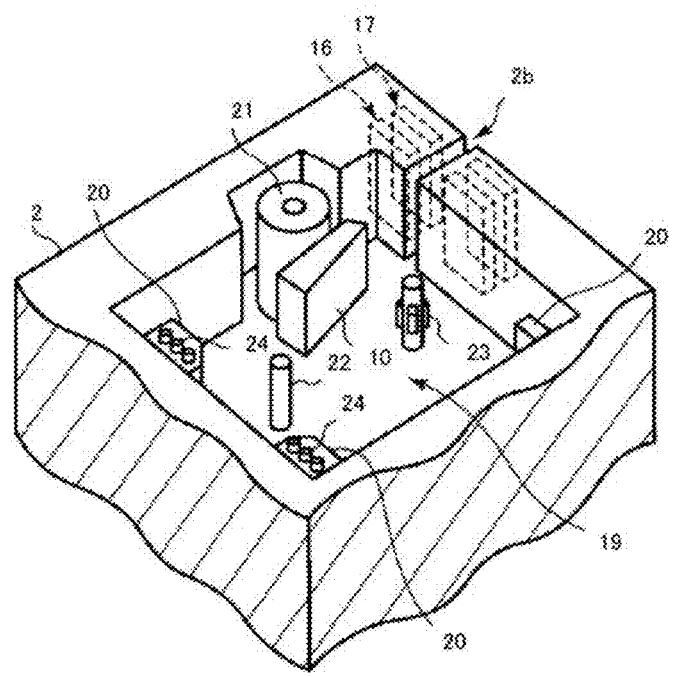
FIG. 3 is a perspective view illustrating a cassette compartment in the printer according to the embodiment.
Figure 4:
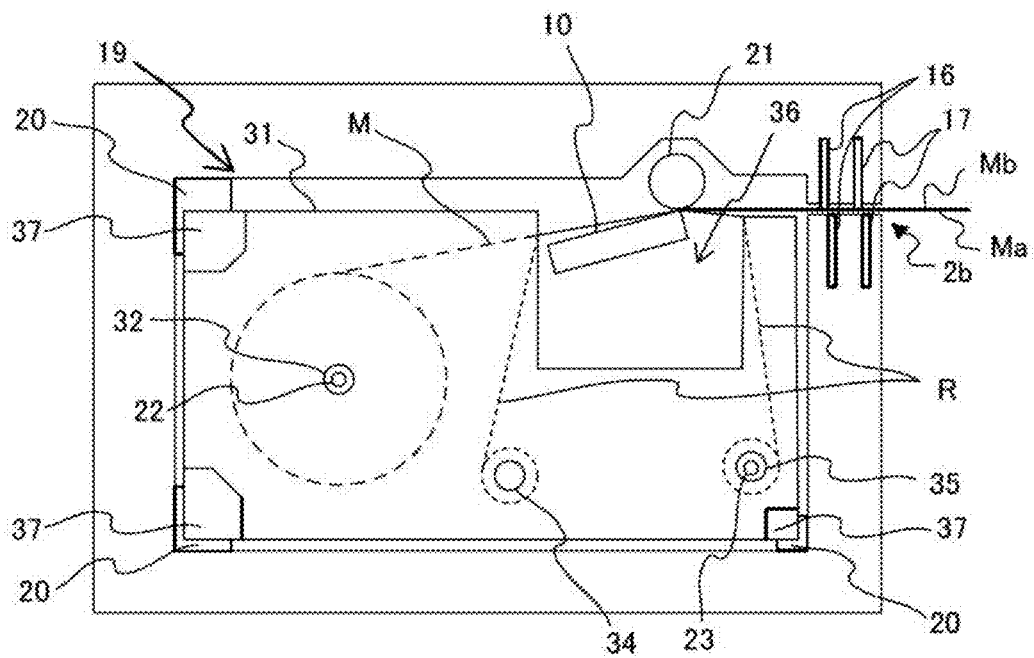
FIG. 4 is a cross-sectional view illustrating the printer according to the embodiment.

A full cut button 3 for manually actuating the full-cutting device 16 illustrated in FIGS. 3 and 4 in order to make a full cut through the printing medium M is arranged on the top face of the case 2.

Alternatively, a full cut key for making full cuts may be configured such that pressing the full cut key makes the controller 5 activate a cutter motor driver circuit 14 that then actuates the full-cutting device 16.

Here, a "full cut" refers to the operation of cutting completely through the printing medium M, thereby cutting through both the base material Ma and the release paper Mb of the printing medium M in the width direction thereof.

The case 2 also includes various components that are not illustrated in the figure such as a power cord connection terminal as well as an external device connection terminal and a storage media insertion port that can function as the interface device 25.

The case 2 further includes an opening/closing lid that can open and close the cassette compartment 19 formed in the case 2. A window 2a is formed in the left side face of the case 2 in order to make it possible to visually check whether a tape cassette 30 (see FIG. 2) is currently housed in the cassette compartment 19 even when the cassette compartment 19 is closed.

Moreover, a feedout port 2b through which the printing medium M that has been printed on can be fed to outside of the device is formed in the front face of the case 2.

Figure 2:
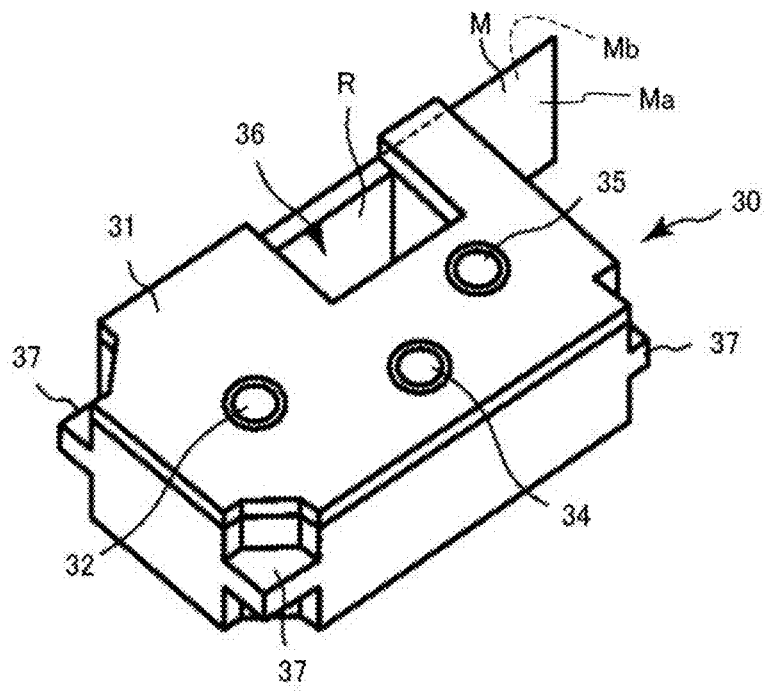
FIG. 2 is a perspective view illustrating a tape cassette housed in the printer according to the embodiment.

FIG. 2 is a perspective view illustrating the tape cassette 30 housed in the printer 1.

FIG. 3 is a perspective view illustrating the cassette compartment 19 in the printer 1.

FIG. 4 is a cross-sectional view illustrating the printer 1.

The tape cassette 30 illustrated in FIG. 2 is removably housed within the cassette compartment 19 illustrated in FIG. 3. FIG. 4 depicts a state in which the tape cassette 30 is currently housed within the cassette compartment 19.

As illustrated in FIG. 2, the tape cassette 30 includes a cassette case 31 in which a thermal head insertion region 36 and engagement regions 37 are formed.

The cassette case 31 stores the printing medium M and an ink ribbon R. The cassette case 31 includes a tape core 32, an ink ribbon supply core 34, and an ink ribbon winding core 35.

The printing medium M is wound in a roll around the tape core 32 inside of the cassette case 31.

Moreover, the thermal transfer ink ribbon R is wound in a roll around the ink ribbon supply core 34 inside of the cassette case 31, with the leading end being wound around the ink ribbon winding core 35.

As illustrated in FIG. 3, a plurality of cassette-receiving portions 20 for supporting the tape cassette 30 at prescribed positions are formed inside of the cassette compartment 19 in the case 2.

These cassette-receiving portions 20 include tape width detection switches 24 that automatically detect the type of tape cassette (that is, the tape width of the printing medium M) by detecting the shape of protrusions and recesses formed in the tape cassette 30.

Furthermore, the thermal head 10 (an example of a printing device that prints on the printing medium M), a platen roller 21 (a conveying device that conveys the printing medium M), a tape core-engaging axle 22, and an ink ribbon winding driver axle 23 are arranged inside of the cassette compartment 19.

As illustrated in FIG. 4, when the tape cassette 30 is housed within the cassette compartment 19, the engagement regions 37 formed in the cassette case 31 are supported by the cassette-receiving portions 20 formed in the cassette compartment 19, and the thermal head 10 is inserted into the thermal head insertion region 36 formed in the cassette case 31.

Moreover, the tape core 32 of the tape cassette 30 is fitted onto the tape core-engaging axle 22, and the ink ribbon winding core 35 is fitted onto the ink ribbon winding driver axle 23.

Once the interface device 25 receives printing data and the controller 5 starts the printing process, the printing medium M is drawn out from the tape core 32 by the rotation of the platen roller 21.

Here, the ink ribbon winding driver axle 23 rotates in sync with the platen roller 21 so that the ink ribbon R is drawn out from the ink ribbon supply core 34 in unison with the printing medium M.

In this way, the printing medium M and the ink ribbon R are conveyed along in an overlapping manner.

Then, the thermal head 10 heats the ink ribbon R as the ink ribbon R passes between the thermal head 10 and the platen roller 21 in order to transfer the ink from the ink ribbon R onto the printing medium M and thereby print on the printing medium M.

The used ink ribbon R that has passed between the thermal head 10 and the platen roller 21 is then wound around the ink ribbon winding core 35.

Meanwhile, the printed printing medium M that has passed between the thermal head 10 and the platen roller 21 is either full-cut by the full-cutting device 16 or half-cut by a half-cutting device 17 (an example of a second cutting device) and then fed out through the feedout port 2b. Here, a "half cut" refers to the operation of cutting just the base material Ma in the width direction thereof.

Figure 15A:
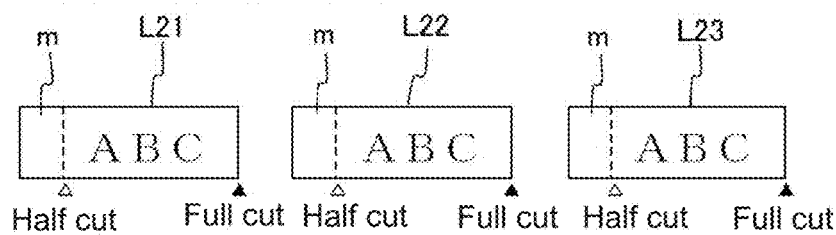
FIGS. 15A and 15B are explanatory drawings for explaining a method of printing according to a second conventional technology.
Figure 15B:
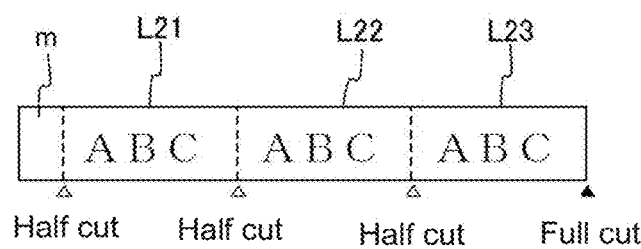
Figure 16A:
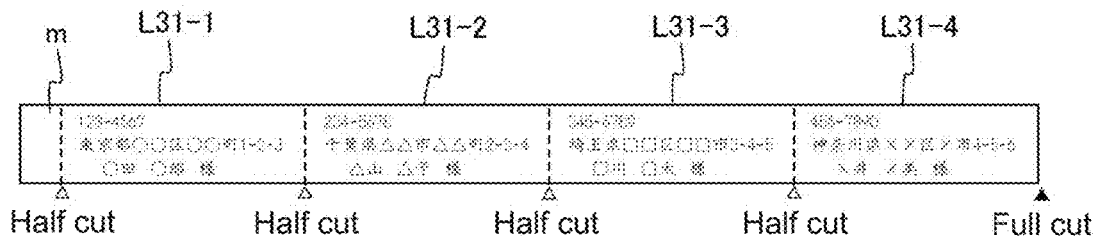
FIGS. 16A to 16C are (first) explanatory drawings for explaining a method of printing according to a third conventional technology.
Figure 16B:
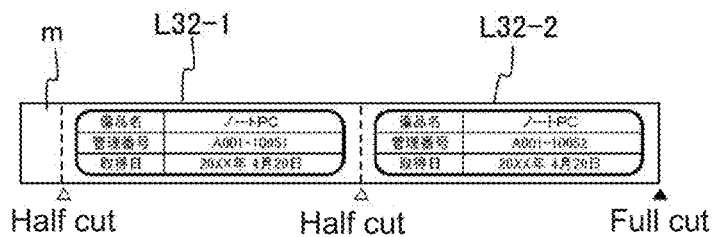
Figure 16C:
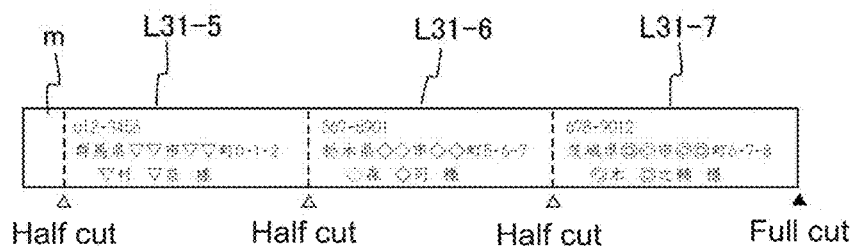

Moreover, as described above, a blank portion m (see FIGS. 14 to 16) is left connected to the printed material due to the distance between the full-cutting device 16 and the thermal head 10. Thus, from the perspective of reducing the size of this blank portion m, it is preferable that the full-cutting device 16 be positioned as close to the thermal head 10 as possible.

Therefore, the full-cutting device 16 is positioned closer to the thermal head 10 than the half-cutting device 17.

FIG. 5 is a control block diagram illustrating the printer 1.

As illustrated in FIG. 5, the printer 1 includes the thermal head 10, the full-cutting device 16, the half-cutting device 17, the platen roller 21, and the tape width detection switches 24 as described above, as well as the controller 5, a read-only memory (ROM) 6, a random-access memory (RAM) 7, a head driver circuit 9, a conveyor motor driver circuit 11, a stepping motor 12, a cutter motor driver circuit 14, a cutter motor 15, and the interface device 25.

Here, the controller 5, the ROM 6, and the RAM 7 form a computer of the printer 1. Moreover, the interface device 25 is an example of an acquisition device that acquires printing data for creating labels (an example of one or more printed materials) as well as identification information for identifying which user sent the printing data and which device generated the printing data.

The controller 5 is a processor such as a microprocessor, for example. The controller 5 transfers programs stored in the ROM 6 to the RAM 7 and then executes those programs in order to control the operation of the components of the printer 1.

The ROM 6 stores programs for executing various processes in a method of printing control according to the present embodiment (described later), printing programs for printing, various types of data needed to execute the printing programs (such as fonts, for example), and the like.

The ROM 6 also functions as a storage medium that stores programs that can be read by the controller 5.

The RAM 7 functions as an input data memory that stores information about the printing content to be printed on the printing medium M.

The RAM 7 also functions as a printing data memory that stores printing pattern data that represents the printing content and is generated based on the printing content information that was input.

The head driver circuit 9 controls the thermal head 10 in accordance with the printing pattern data stored in the RAM 7.

The thermal head 10 is a printhead that includes a plurality of heating elements arranged in a primary scanning direction.

The conveyor motor driver circuit 11 controls the stepping motor 12. The stepping motor 12 drives the platen roller 21 and a roller conveyor (not illustrated in the figures).

The platen roller 21 and the roller conveyor rotate using the power supplied by the stepping motor 12 and thereby convey the printing medium M in the lengthwise direction thereof (a secondary scanning direction).

The cutter motor driver circuit 14 controls the cutter motor 15. The full-cutting device 16 and the half-cutting device 17 operate using the power supplied by the cutter motor 15.

The interface device 25 includes components such as a wireless communication device or the external device connection terminal and storage media insertion port formed in the case 2 as described above, for example, and manages the transfer of various types of information between the various devices involved.

The interface device 25 receives printing data from users' computing devices via a wireless or wired connection.

The interface device 25 also acquires identification information for identifying the user who sent the printing content. This identification information should include at least one of the communication method used for the printing data, an IP address or MAC address indicating the sender of the printing data, and a user ID included in the printing data, for example.

Note that the printing data received at one time by the interface device 25 may include just a single set of printing content constituted by text, patterns, graphics, or the like for creating a single printed material or may include a plurality of sets of printing content for creating a plurality of printed materials. Moreover, the printing data may include identification information such as a user ID that is assigned to the user who created the printing content.

Figure 6:
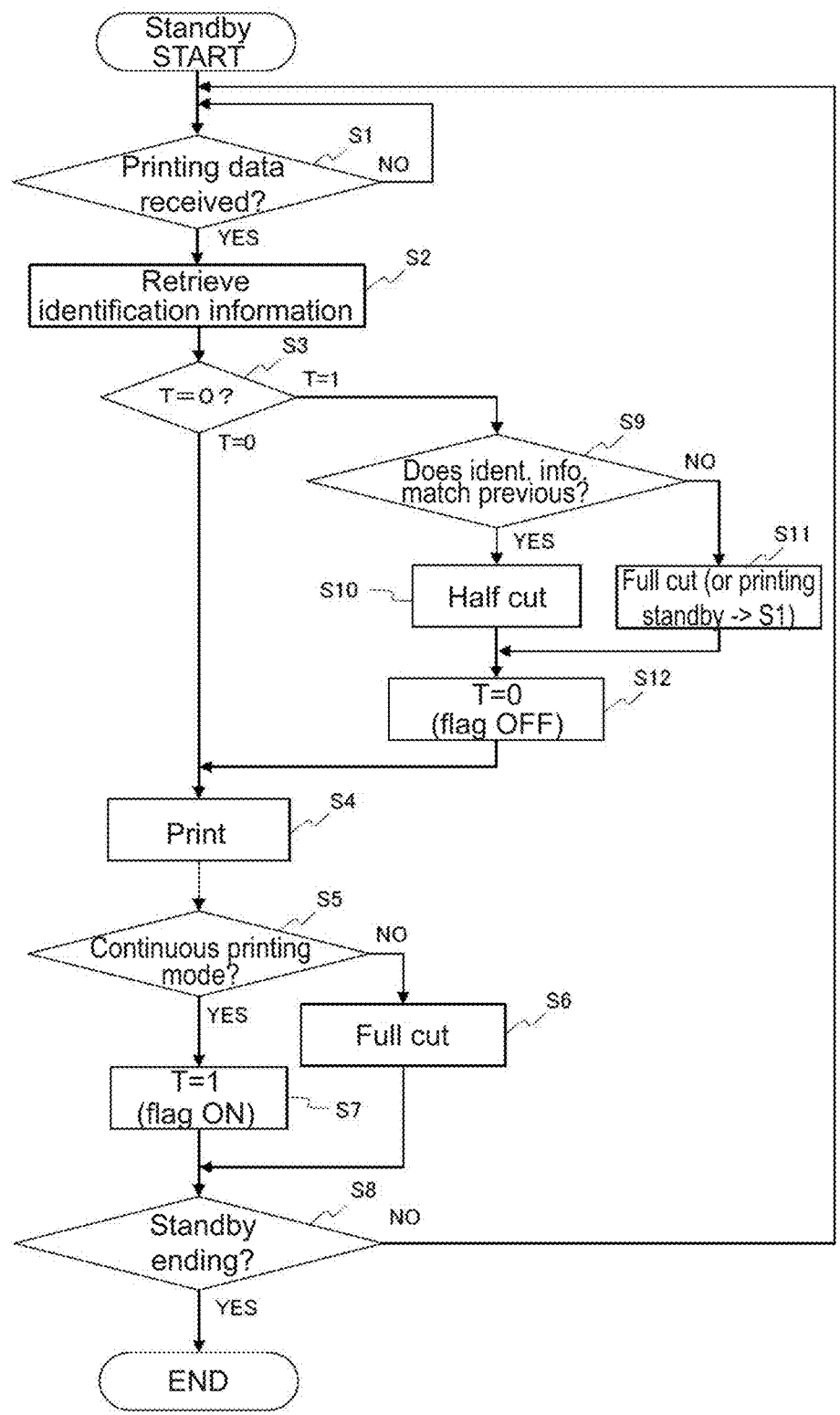
FIG. 6 is a flowchart for explaining a method of printing control according to the embodiment.

FIG. 6 is a flowchart for explaining a method of printing control according to the present embodiment.

Figure 7:
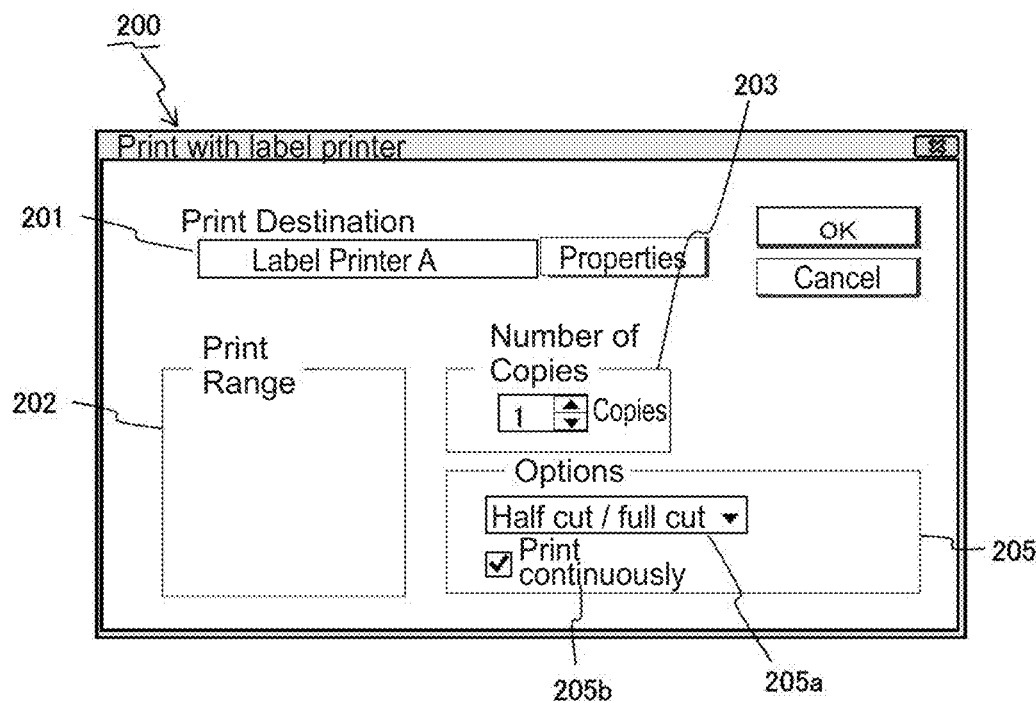
FIG. 7 illustrates a printing settings screen that is displayed on a computing device in the embodiment.

FIG. 7 illustrates a printing settings screen 200 that is displayed on a computing device.

FIGS. 8 to 11 are explanatory drawings for explaining identification information.

Figure 12:
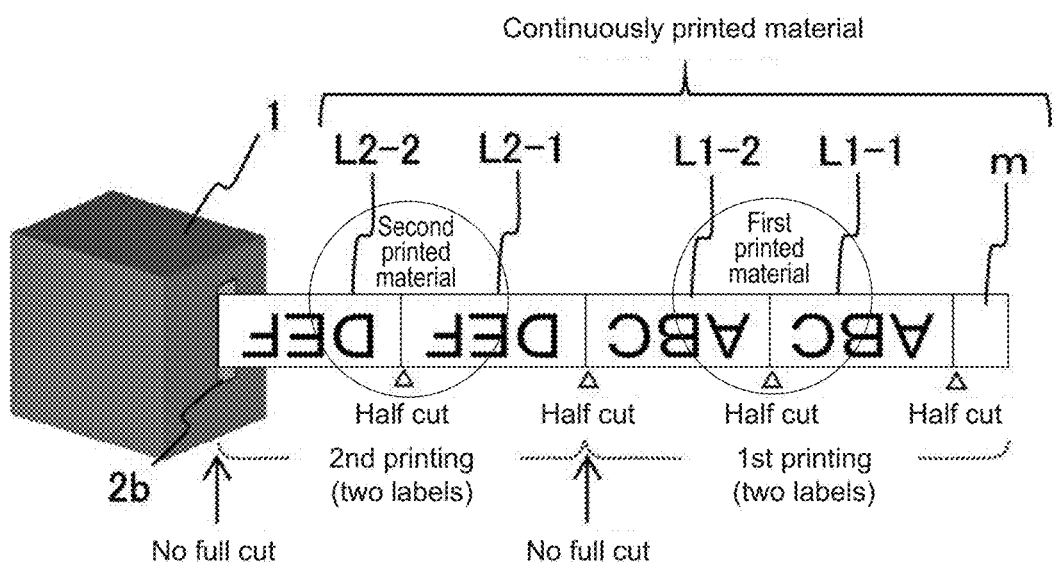
FIG. 12 is a (first) explanatory drawing for explaining a continuously printed material in the embodiment.
Figure 13:
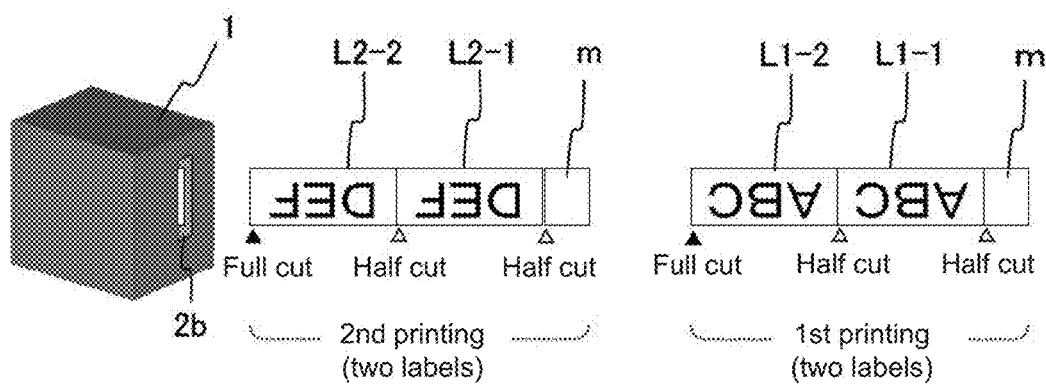
FIG. 13 is a (second) explanatory drawing for explaining a continuously printed material in the embodiment.

FIGS. 12 and 13 are explanatory drawings for explaining continuously printed materials.

The controller 5 illustrated in FIG. 5 starts the process illustrated in the flowchart in FIG. 6 upon determining that the printer 1 is waiting for printing data.

Whether the printer 1 is in this waiting state may be determined according to whether the printer 1 is currently turned on or whether the printer 1 is currently turned on and ready for communications, for example.

Figure 8:
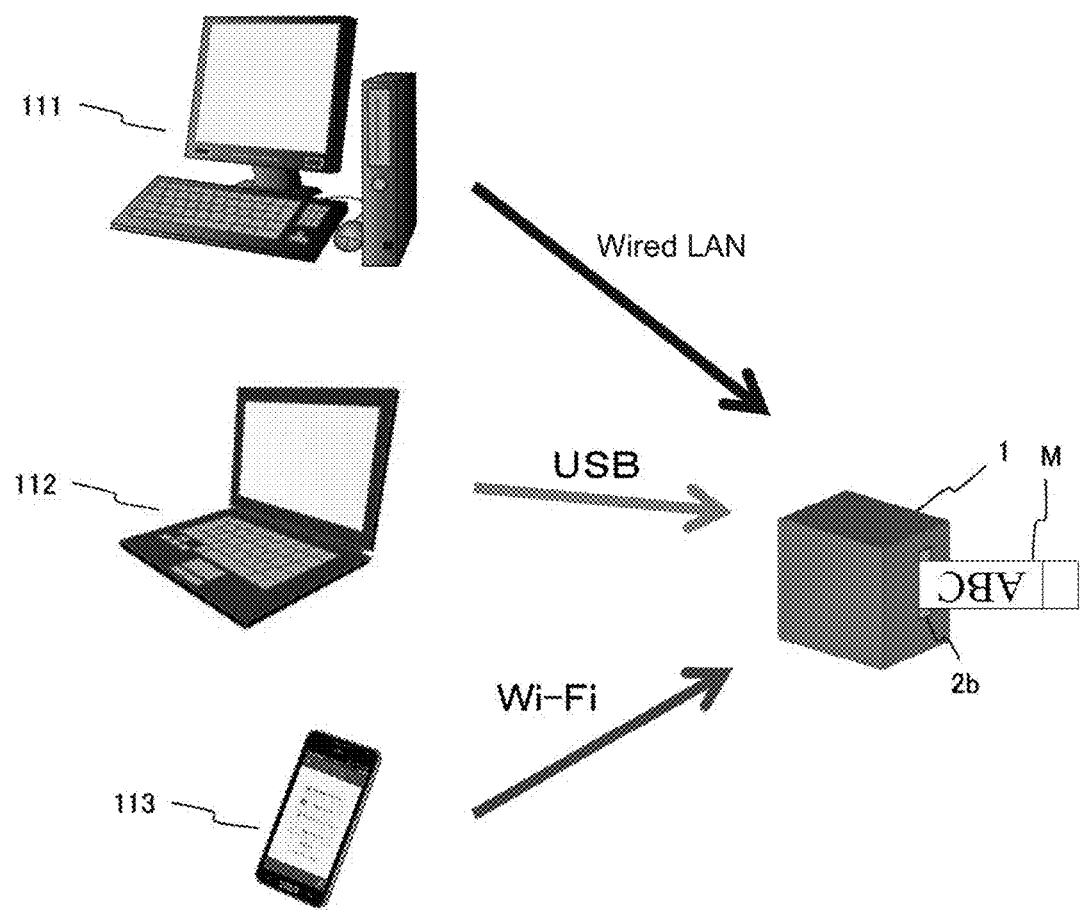
FIG. 8 is a (first) explanatory drawing for explaining identification information in the embodiment.

First, in step S1, the controller 5 repeatedly determines whether printing data has been received until the interface device 25 illustrated in FIG. 5 receives printing data from any of the computing devices 111, 112, and 113 illustrated in FIG. 8, for example.

As described above, this printing data includes one or more sets of printing content such as text, graphics, or patterns to be printed on labels.

Moreover, this printing data is sent from one of the computing devices 111 to 113 illustrated in FIG. 8 to the printer 1 (that is, to the interface device 25) via a wireless or wired connection once a user creates the printing content on that computing device 111 to 113 and then configures the desired settings on the printing settings screen 200 illustrated in FIG. 7, for example.

Note that for convenience, FIGS. 8 to 13 depict a simpler version of the printer 1 than FIG. 1. In particular, FIGS. 8 to 13 only illustrate the feedout port 2b of the printer 1, which is changed to being oriented vertically rather than horizontally in order to show the printing surface of the printing medium M.

The printing settings screen 200 illustrated here is a simplified example but includes a print destination field 201 for selecting the destination printer, a print range field 202 for specifying the print range of the created printing content, a number of copies field 203 for selecting the number of labels to print for each set of printing content, and an options group 205 that includes a cutting method option 205a for selecting the cutting method and a continuous printing mode option 205b for specifying to use the continuous printing mode.

For the continuous printing mode option 205b, the continuous printing mode is enabled when the printing data is sent with the "Print continuously" check box selected, and the continuous printing mode is disabled when the printing data is sent with this check box cleared.

Figure 17:
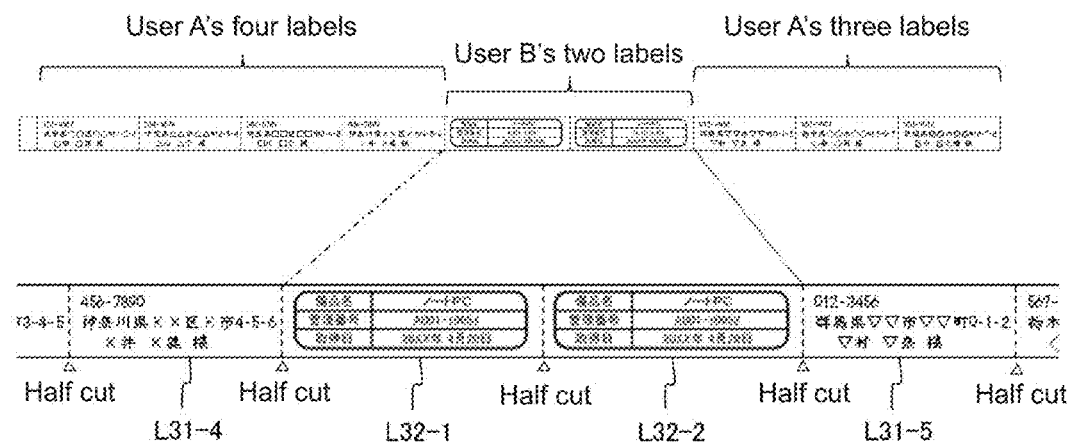
FIG. 17 is a (second) explanatory drawing for explaining the method of printing according to the third conventional technology.

Here, the continuous printing mode makes it possible to create labels continuously, with the one or more labels corresponding to one set of printing data that was sent being separated from the one or more labels corresponding to each subsequently received set of printing data by a half cut (see FIG. 17).

Returning to the flowchart in FIG. 6, once printing data has been received (YES in step S1), the interface device 25 proceeds to step S2 and acquires identification information for identifying the user who sent the printing data and/or the device that generated the printing data.

Note that the step for acquiring identification information (step S2) may alternatively be performed at the same time as the step for receiving the printing data (step S1) or be performed before the process for receiving the printing content included in the printing data is complete.

This identification information includes at least one of the communication method used for the printing data, an IP address or MAC address indicating the sender of the printing data, and a user ID assigned to the user, for example.

In the example illustrated in FIG. 8, the communication method used for printing data sent from the computing device 111 (a desktop computer) is a wired LAN connection, while the communication method used for printing data sent from the computing device 112 (a notebook computer) is USB, and the communication method used for printing data sent from the computing device 113 (a smartphone) is Wi-Fi.

Figure 9:
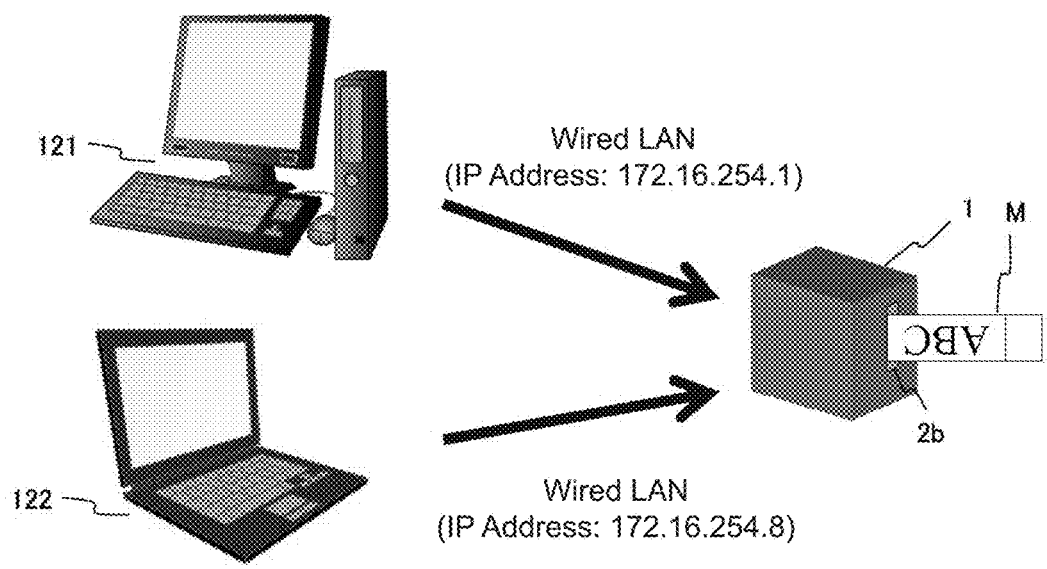
FIG. 9 is a (second) explanatory drawing for explaining identification information in the embodiment.

In the example illustrated in FIG. 9, the communication method used for printing data sent from a computing device 121 (a desktop computer) is the same wired LAN connection that is the communication method used for printing data sent from a computing device 122 (a notebook computer), although here the IP addresses of each computing device are different.

Figure 10:
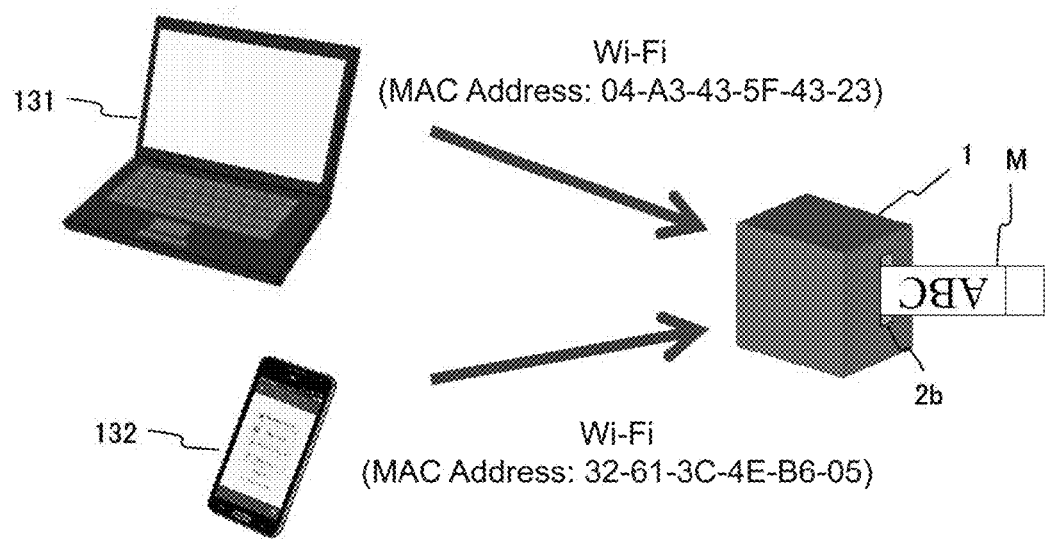
FIG. 10 is a (third) explanatory drawing for explaining identification information in the embodiment.

In the example illustrated in FIG. 10, the communication method used for printing data sent from a computing device 131 (a notebook computer) is the same Wi-Fi connection that is the communication method used for printing data sent from a computing device 132 (a smartphone), but here the MAC addresses of each computing device are different.

Figure 11:
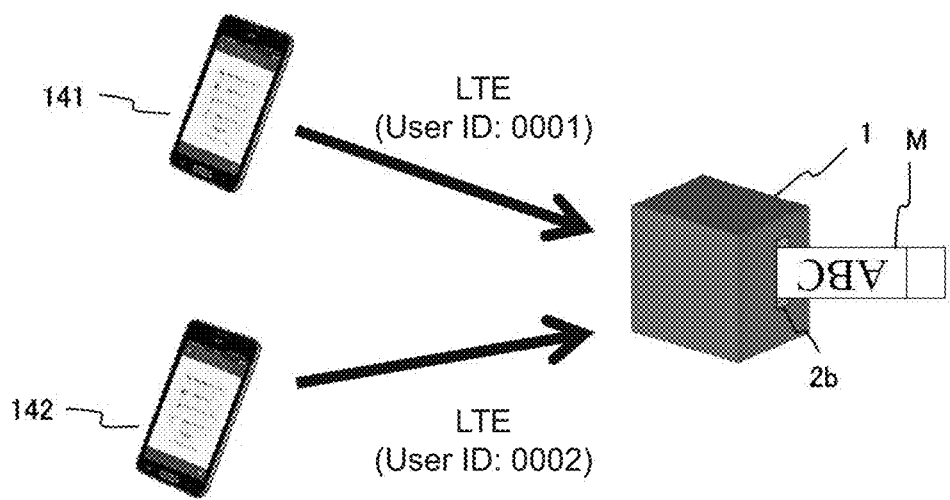
FIG. 11 is a (fourth) explanatory drawing for explaining identification information in the embodiment.

In the example illustrated in FIG. 11, the communication method used for printing data sent from a computing device 141 (a smartphone) is the same Long-Term Evolution (LTE) connection that is the communication method used for printing data sent from a computing device 142 (another smartphone), but here the user IDs input on each computing device in a cloud application, for example, are different.

Returning to the flowchart in FIG. 6, after the identification information has been acquired (step S2), the controller 5 proceeds to step S3 and determines whether a flag T is equal to 0.

This flag T has an initial value of 0, and therefore the first time that printing data is received, the controller 5 determines that the flag T is indeed equal 0 (T=0 in step S3).

Then, the controller 5 proceeds to step S4 and makes the head driver circuit 9 control the thermal head 10 in accordance with the printing pattern data created from the printing content included in the printing data in order to print on the printing medium M as described above.

As illustrated in FIGS. 12 and 13, for example, in this printing process (step S4), the controller 5 uses the half-cutting device 17 to make a half cut in the rear end of the blank portion m that is present on the end of the printing medium M as described above and then uses the thermal head 10 to print two labels L1-1 and L1-2 that include the text "ABC" and correspond to the first set of printing data that was received. Here, a half cut is also made between the two labels L1-1 and L1-2.

At this stage, neither a half cut nor a full cut is made in the rear end (left end) of the last label L1-2 (see FIG. 14E), and the printing medium M enters a standby state while the device waits for the next operation.

Note that if the printing medium M was instead conveyed to the full cut position (the state illustrated in FIG. 14F), the next blank portion m would be formed as described above. Therefore, it is preferable that the printing medium M stand by (be maintained) at the state (position) illustrated in FIG. 14E that corresponds to the end of the current printing process.

In this way, keeping the printing medium M on standby in the state illustrated in FIG. 14E that corresponds to the end of the current printing process while waiting to determine whether to print the next printing data continuously prevents the printing medium M from being conveyed to the full cut position (the state illustrated in FIG. 14F) and thereby resulting in the formation of the next blank portion m.

Next, the controller 5 proceeds to step S5 and determines whether the continuous printing mode was specified in the printing data received by the interface device 25 in the printing data receipt determination process (step S1). In other words, the controller 5 determines whether the printing data was sent with the "Print continuously" check box selected for the continuous printing mode option 205b in the printing settings screen 200 illustrated in FIG. 7, for example.

As illustrated in FIG. 13, if it is determined that the continuous printing mode was not specified (NO in step S5), the controller 5 proceeds to step S6 and controls the full-cutting device 16 to make a full cut in the rear end of the last label L1-2 included in the first set of printing data.

When making this full cut, the controller 5 makes the conveyor motor driver circuit 11 convey the printing medium M until the rear end of the last label L1-2 reaches the full cut position at which the full-cutting device 16 is arranged. In this way, as illustrated in FIG. 13, the labels L1-1 and L1-2 corresponding to the first set of printing data are created separated by a full cut from labels L2-1 and L2-2 that include the text "DEF" and correspond to a second set of received printing data.

Meanwhile, if it is determined that the continuous printing mode was specified (YES in step S5), the controller 5 proceeds to step S7 and sets the flag T to a value of 1.

At this stage, neither the full cut illustrated in FIG. 13 nor the half cut illustrated in FIG. 12 is made in the rear end of the last label L1-2 included in the first set of printing data.

Once either the full cut process (step S6) or the process for setting the flag T to a value of 1 (step S7) is complete, the controller 5 illustrated in FIG. 5 proceeds to step S8 and determines whether the process for waiting for printing data is complete.

If the waiting process is complete (YES in step S8), the overall process illustrated in FIG. 6 is ended, while if the waiting process is not yet complete (NO in step S8), the controller 5 returns to the printing data receipt determination process (step S1).

Note that the full cut in step S6 is not made when it is determined that the continuous printing mode was specified (YES in step S5), and therefore if the next set of printing data cannot be received for whatever reason, the rear end of the last created label L1-2 is not cut and remains connected to the printing medium M within the printer 1.

In this case, the user must press the full cut button 3 illustrated in FIG. 1 or press the full cut key described above in order to make a full cut in the rear end of the last label L1-2.

Here, after the user presses the full cut button 3, the controller 5 makes the conveyor motor driver circuit 11 convey the printing medium M until the rear end of the last label L1-2 reaches the full cut position at which the full-cutting device 16 is arranged, and then the controller 5 controls the full-cutting device 16 to make a full cut.

Moreover, if the user inputs a power OFF operation, if a prescribed period of time elapses after the last set of printing data was received, or if the user inputs an operation for making a full cut on the computing device, for example, the controller 5 may automatically control the full-cutting device 16 to make a full cut in the rear end of the last label.

Next, the case in which the flag T is equal to 1 (T=1 in step S3) in the process for determining whether the flag T is equal to 0 (step S3) will be described.

The flag T is equal to 1 when the continuous printing mode was specified in the last set of printing data that was received. As described above, in this case neither the full cut illustrated in FIG. 13 nor the half cut illustrated in FIG. 12 has been made in the rear end of the last label L1-2 corresponding to the first set of printing data (first printing data).

Here, the controller 5 proceeds to step S9 and determines whether the identification information (second identification information) corresponding to the most recently received (second) set of printing data (second printing data) matches the identification information (first identification information) corresponding to the previously received (first) set of printing data in order to determine whether the most recently received set of printing data was sent by the same user as the previously received set of printing data.

If, as illustrated in FIG. 8 for example, the previous printing data was sent from the computing device 111 using the wired LAN communication method and then the current printing data was sent from the computing device 112 using the USB communication method, the identification information would be determined to not match because the communication methods do not match.

Moreover, as illustrated in FIG. 9, if the sets of printing data are sent from the computing devices 121 and 122 and are both sent using the wired LAN communication method, the IP addresses are compared, and the identification information is determined to not match if the IP addresses are different.

Similarly, as illustrated in FIG. 10, if the sets of printing data are sent from the computing devices 131 and 132 and are both sent using the Wi-Fi communication method, the MAC addresses are compared, and the identification information is determined to not match if the MAC addresses are different.

Furthermore, as illustrated in FIG. 11, if the sets of printing data are sent from the computing devices 141 and 142 and are both sent using the LTE communication method, the user IDs are compared, and the identification information is determined to not match if the user IDs are different.

Note that the controller 5 may also simply compare at least one of the IP addresses, the MAC addresses, and the user IDs and not compare the communication methods.

Moreover, this determination may be made on the basis of types of identification information other than those described above as long as that identification information can be used to uniquely identify users.

Furthermore, when the same user sends printing data from different computing devices, for example, even if the communication methods, IP addresses, or MAC addresses are different, the printing data may be determined to have been sent from the same user as long as the user IDs match.

If it is determined that the current identification information matches the previous identification information (YES in step S9), the controller 5 proceeds to step S10 and as illustrated in FIG. 12 makes a half cut in the rear end of the last label L1-2 included in the first set of printing data, proceeds to step S12 and sets the flag T to a value of 0, and then proceeds to step S4 and as illustrated in FIG. 12 prints the two labels L2-1 and L2-2 corresponding to the second set of printing data that was sent.

In this way, the two labels L1-1 and L1-2 corresponding to the first set of printing data and the two labels L2-1 and L2-2 corresponding to the second set of printing data are created as a continuously printed material and are not separated from one another by a full cut.

Note that in a printer that does not include a half-cutting device, lines indicating where to cut may be printed instead making half cuts.

Moreover, as illustrated in FIG. 13, if it is determined that the current identification information does not match the previous identification information (NO in step S9), the controller 5 proceeds to step S11 and makes a full cut in the rear end of the last label L1-2 included in the first set of printing data, proceeds to step S12 and sets the flag T to a value of 0, and then proceeds to step S4 and prints the two labels L2-1 and L2-2 corresponding to the second set of printing data as described above.

Note that the printing medium M stops being conveyed once the printing process is complete (see FIG. 14E), and therefore when making a half cut (step S10) or a full cut (step S11), the printing medium M is first conveyed to the corresponding position.

Moreover, instead of making a full cut (step S11), the controller 5 may put creation of the labels L2-1 and L2-2 corresponding to the second set of printing data on standby and return to and repeat the printing data receipt determination process (step S1) in order to make it possible to wait for the user that sent the first set of printing data to send more printing data (third printing data).

This makes it possible to create the labels L1-1 and L1-2 corresponding to the first set of printing data and the labels corresponding to the additional printing data sent by the same user who sent the first printing data as a continuously printed material.

Furthermore, the standby state of the suspended second printing data may be removed after a prescribed period of time elapses, and the process may be resumed from the identification information match determination process (step S9), for example.

In the continuously printed material illustrated in FIG. 12, only a single blank portion m is present for the labels L1-1 and L1-2 corresponding to the first set of printing data and the labels L2-1 and L2-2 corresponding to the second set of printing data. Meanwhile, as illustrated in FIG. 13, when the labels L1-1 and L1-2 corresponding to the first set of printing data are separated from the labels L2-1 and L2-2 corresponding to the second set of printing data, two blank portions m are present.

In the present embodiment as described above, the printer 1 includes the interface device 25 (an example of an identification information acquisition device) that acquires printing data for creating one or more printed materials as well as identification information for identifying the user who sent the printing data and/or the device that generated the printing data (such as the computing device 111), the thermal head 10 (an example of a printing device) that prints on the printing medium M based on the printing data, a full-cutting device 16 (an example of a first cutting device) that cuts the printing medium M on which the thermal head 10 prints, and the controller 5.

The controller 5 determines (in step S11), in accordance with sets of identification information respectively corresponding to first printing data (such as the first set of printing data) and second printing data (such as the second set of printing data) acquired after the first printing data from among printing data acquired by the interface device 25, whether to create one or more printed materials (the labels L1-1 and L1-2) corresponding to the first printing data and one or more printed materials (the labels L2-1 and L2-2) corresponding to the second printing data as a continuously printed material that as illustrated in FIG. 12 is not separated by the full-cutting device 16, or to create the one or more printed materials corresponding to the first printing data and the one or more printed materials corresponding to the second printing data separated from one another by the full-cutting device 16 as illustrated in FIG. 13.

In this way, when the users match, the one or more printed materials corresponding to the first printing data and the one or more printed materials corresponding to the second printing data can be created as a continuously printed material and without being separated from one another by a full cut.

Meanwhile, when the users do not match, the one or more printed materials corresponding to the first printing data and the one or more printed materials corresponding to the second printing data can be created separated from one another by a full cut.

Therefore, the present embodiment makes it possible to prevent printed materials that multiple users are attempting to create from getting intermixed with one another when the printed materials corresponding to multiple sets of separately received printing data are created without being separated from one another.

Moreover, in the present embodiment, when a continuous printing mode (the continuous printing mode option 205*b*) for creating a continuously printed material is specified in the first printing data, the controller 5 makes the determination described above (step S9), and when the continuous printing mode is not specified in the first printing data, the controller 5 does not make the determination described above and uses the full-cutting device 16 (in step S6) to separate the one or more printed materials corresponding to the first printing data and the one or more printed materials corresponding to the second printing data from one another when creating those printed materials.

Making this determination when the continuous printing mode is specified makes it possible for a user to create a continuously printed material when desired.

Moreover, in the present embodiment, the printing medium M includes the base material Ma and the release paper Mb that is peelably adhered to the base material Ma, and the printer 1 further includes the half-cutting device 17 (an example of a second cutting device) that cuts only the base material Ma of the base material Ma and the release paper Mb.

When creating the continuously printed material illustrated in FIG. 12, the half-cutting device 17 makes a cut (a half cut) between the one or more printed materials (the labels L1-1 and L1-2) corresponding to the first printing data and the one or more printed materials (the labels L2-1 and L2-2) corresponding to the second printing data. Therefore, the one or more printed materials respectively corresponding to the multiple sets of printing data are left connected to one another, thereby making it possible for the user to more easily handle those printed materials.

Moreover, in the present embodiment, when the first identification information corresponding to the first printing data does not match the second identification information corresponding to the second printing data, the controller 5 puts creation of the one or more printed materials (the labels L2-1 and L2-2 illustrated in FIG. 13) corresponding to the second printing data on standby (the case in parentheses in step S11), and then creates one or more labels corresponding to third printing data that is acquired later and also has the first identification information together with the one or more printed materials (the label L1-1 and L1-2) corresponding to the first printing data as a continuously printed material.

This makes it possible to wait for the user who sent the first printing data to send more printing data.

This, in turn, makes it possible to create a continuously printed material as described above even when multiple sets of printing data that are sent by the same user are not sent sequentially.

Furthermore, in the present embodiment, the identification information includes at least one of the communication method used for the printing data, an IP address or MAC address indicating the sender of the printing data, and a user ID assigned to the user, for example. This makes it possible to easily and reliably identify users.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:
1. A printer, comprising:
    an acquisition device that acquires printing data for creating one or more printed materials and identification information that identifies at least one of a user who sent the printing data and a device that generated the printing data;

a printing device that prints the printing data corresponding to the one or more printed materials on a printing medium;

a first cutting device that separates the printing medium that has been printed on; and a processor that, when the acquisition device acquires first printing data and first identification information as the identification information of the first printing data and then acquires second printing data and second identification information as the identification information of the second printing data, determines, in accordance with the first identification information and the second identification information, whether to use the first cutting device to separate one or more first printed materials created in accordance with the first printing data on the printing medium from one or more second printed materials created on the printing medium in accordance with the second printing data, and controls the first cutting device in accordance with said determination, wherein after causing the printer to create the one or more first printed materials based on the first printing data, the processor maintains the printing medium on standby at a position at which the creation of the one or more first printed materials was completed, and thereafter performs control so as to cause the printer to create the one or more second printed materials when the acquisition device acquires the second printing data and the second identification information, wherein the first printing data includes information indicating whether a continuous printing mode for creating a continuously printed material is specified, wherein the processor determines not to separate the one or more first printed materials from the one or more second printed materials when the continuous printing mode is specified in the first printing data and the first identification information matches the second identification information, wherein the processor determines to separate the one or more first printed materials from the one or more second printed materials when the continuous printing mode is not specified in the first printing data even when the first identification information matches the second identification information, and wherein in the continuous printing mode, absent a specific command from a user to separate the printing medium, the processor does not cause the first cutting device to separate the printing medium while the second identification information and the second printing data are not acquired, thereby leaving the printing medium unseparated if the second identification information and the second printing data are never received.

2. The printer according to claim 1,
wherein the processor determines to separate the one or more first printed materials from the one or more second printed materials when the continuous printing mode is specified in the first printing data and the first identification information does not match the second identification information.

3. The printer according to claim 1,
wherein the printing medium includes a base material and a release sheet that is peelably adhered to the base material, wherein the printer further comprises a second cutting device that cuts only the base material of the printing medium, and wherein the processor controls the second cutting device to make a cut between the one or more first printed materials and the one or more second printed materials when the one or more first printed materials are not to be separated from the one or more second printed materials.

4. The printer according to claim 1, wherein the identification information includes at least one of a communication method used for the printing data, an IP address or MAC address indicating a sender of the printing data, and a user ID assigned to the user.

5. A method of printing control to be performed by a printer that includes a printing device that prints printing data corresponding to one or more printed materials on a printing medium; and a first cutting device that separates the printing medium that has been printed on, the method comprising:

acquiring first printing data for creating one or more first printed materials on the printing medium and first identification information that identifies at least one of a user who sent the first printing data and a device that generated the first printing data;

after causing the printer to create the one or more first printed materials on the printing medium based on the first printing data, maintaining the printing medium on standby at a position at which the creation of the one or more first printed materials was completed;

if the printer acquires second printing data for creating one or more second printed materials on the printing medium and second identification information that identifies at least one of a user who sent the second printing data and a device that generated the second printing data, causing the printer to create the one or more second printed materials based on the second printing data and the second identification information;

determining, in accordance with the first identification information and the second identification information, whether to use the first cutting device to separate the one or more first printed materials created on the printing medium in accordance with the first printing data from the one or more second printed materials created on the printing medium in accordance with the second printing data; and controlling the first cutting device in accordance with said determination, wherein the first printing data includes information indicating whether a continuous printing mode for creating a continuously printed material is specified, wherein the step of determining includes:
determining not to separate the one or more first printed materials from the one or more second printed materials when the continuous printing mode is specified in the first printing data and the first identification information matches the second identification information; and determining to separate the one or more first printed materials from the one or more second printed materials when the continuous printing mode is not specified in the first printing data even when the first identification information matches the second identification information, and wherein the method further includes, in the continuous printing mode, absent a specific command from a user to separate the printing medium, not causing the first cutting device to separate the printing medium while the second identification information and the second printing data are not acquired by the printer, thereby leaving the printing medium unseparated if the second identification information and the second printing data are never acquired.

6. The method of printing control for the printer according to claim 5, wherein the step of determining includes:
determining to separate the one or more first printed materials from the one or more second printed materials when the continuous printing mode is specified in the first printing data and the first identification information does not match the second identification information.

7. The method of printing control for the printer according to claim 5,
wherein the printing medium includes a base material and a release sheet that is peelably adhered to the base material,
wherein the printer further comprises a second cutting device that cuts only the base material of the printing medium, and
wherein the step of determining includes controlling the second cutting device to make a cut between the one or more first printed materials and the one or more second printed materials when the one or more first printed materials are not to be separated from the one or more second printed materials.

8. A non-transitory computer-readable storage medium having stored therein a printing control program executable by a printer,
wherein the printer includes an acquisition device that acquires printing data for creating one or more printed materials and identification information that identifies at least one of a user who sent the printing data and a device that generated the printing data; a printing device that prints the printing data corresponding to the one or more printed materials on a printing medium; and a first cutting device that separates the printing medium that has been printed on based on the printing data, and
wherein, when the acquisition device acquires first printing data and first identification information as the identification information of the first printing data and then acquires second printing data and second identification information as the identification information of the second printing data, said printing control program causes the printer to determine, in accordance with the first identification information and the second identification information, whether to use the first cutting device to separate one or more first printed materials created on the printing medium in accordance with the first printing data from one or more second printed materials to be created in accordance with the second printing data, and controls the first cutting device in accordance with said determination,
wherein after causing the printer to create the one or more first printed materials based on the first printing data, said printing control program causes the printer to maintain the printing medium on standby at a position at which the creation of the one or more first printed materials was completed, and thereafter causes the printer to create the one or more second printed materials when the acquisition device acquires the second printing data and the second identification information,
wherein the first printing data includes information indicating whether a continuous printing mode for creating a continuously printed material is specified,
wherein said printing control program causes the printer to determine not to separate the one or more first printed materials from the one or more second printed materials when the continuous printing mode is specified in the first printing data and the first identification information matches the second identification information,
wherein said printing control program causes the printer to determine to separate the one or more first printed materials from the one or more second printed materials when the continuous printing mode is not specified in the first printing data even when the first identification information matches the second identification information,
wherein in the continuous printing mode, absent a specific command from a user to separate the printing medium, said printing control program does not cause the first cutting device to separate the printing medium when the second identification information and the second printing data are not acquired by the printer, thereby leaving the printing medium unseparated if the second identification information and the second printing data are never received.

\* \* \* \* \*